(12) United States Patent
Kelly et al.

(10) Patent No.: US 8,967,544 B2
(45) Date of Patent: Mar. 3, 2015

(54) AUTOMATIC CARGO HOOK RELEASE ASSEMBLY

(75) Inventors: James A. Kelly, Middlebury, CT (US);
Jesse J. Lesperance, Madison, AL (US);
Ira E. Zoock, Orange, CT (US);
Thomas Zygmant, Southport, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 178 days.

(21) Appl. No.: 13/467,484

(22) Filed: May 9, 2012

(65) Prior Publication Data
US 2013/0299640 A1    Nov. 14, 2013

(51) Int. Cl.
*B64D 1/12*    (2006.01)
(52) U.S. Cl.
USPC ..................................... 244/137.4; 244/118.1
(58) Field of Classification Search
USPC ........ 244/137.4, 17.11, 118.1, 137.1, 122 AE
See application file for complete search history.

(56) References Cited
U.S. PATENT DOCUMENTS

| | | | |
|---|---|---|---|
| 6,189,836 B1* | 2/2001 | Gold et al. | 244/191 |
| 2010/0140412 A1* | 6/2010 | Certain | 244/137.4 |

* cited by examiner

*Primary Examiner* — Rob Swiatek
*Assistant Examiner* — Michael Kreiner
(74) *Attorney, Agent, or Firm* — Cantor Colburn LLP

(57) ABSTRACT

A method of releasing cargo suspended from at least one cargo hook release pendant in a suspension system coupled to a cargo hook release system includes receiving a voltage release signal at a cargo hook control interface and a cargo release harness assembly; receiving an energizing voltage signal at the cargo release harness assembly; energizing a relay in response to receiving the energizing voltage signal, the relay being electrically coupled to the cargo release harness assembly; automatically transmitting the voltage release signal from the cargo release harness assembly to at least one cargo hook release pendant in response to energizing the relay; and automatically releasing the cargo from at least one cargo hook release pendant in response to automatically transmitting the voltage release signal. Also, the cargo hook release system includes the cargo hook control interface, the cargo release harness assembly, and at least one cargo hook release pendant.

13 Claims, 2 Drawing Sheets

AUTOMATIC CARGO HOOK RELEASE ASSEMBLY

FIELD OF INVENTION

The subject matter disclosed herein relates generally to the field of load-management systems in a vertical take-off and landing ("VTOL") aircraft, and more particularly, to an automatic cargo release harness assembly that interconnects to an existing cargo hook release system of a manned, unmanned, or piloted VTOL aircraft for a precision release of one or more loads coupled to the cargo hook release system.

DESCRIPTION OF RELATED ART

A utility VTOL aircraft's ability to carry cargo externally is one of its most important features. Such a utility VTOL aircraft is typically equipped to externally carry any large, long or oddly shaped cargo provided that the cargo is within the lifting capacity of the VTOL aircraft. A significant advantage associated with a lifting capability of the VTOL aircraft is that a cargo may be picked up from or delivered to locations where access by other forms of transportation is difficult or impossible. Additionally, the attached suspension systems do not require the VTOL aircraft to land in order to deliver or pick up the cargo.

Typically, a VTOL aircraft carries external cargo either with a single-point or a multi-point suspension system. A VTOL aircraft may have three external cargo attachment hooks (suspension points) displaced longitudinally on the bottom of the aircraft to carry external cargo—one on the center line forward of the aircraft center of gravity (forward hook), one on the center line substantially at the center of the aircraft's center of gravity (center hook), and one on the center line aft of the center of gravity (aft hook). In a single-point suspension system, external cargo may be independently attached to any attachment hook with up to three independently attached cargo loads carried by each attachment hook. However, in the case of a multi-point suspension system, typically, the forward hook is attached to the front of the cargo and the aft hook is attached to the rear of the cargo in a "Y" shaped arrangement. This arrangement stabilizes the cargo about the yaw axis, thereby significantly reducing the cargo's ability to swing nose left or nose right. In some VTOL aircraft, the suspension system may not be capable of automatically releasing a cargo connected to a cargo hook. Improvements in providing an automatic cargo hook interface that attaches to an existing cargo hook release system of a VTOL aircraft and controlled by a flight control computer ("FCC") would be well received in the art.

BRIEF SUMMARY

According to another aspect of the invention, a method of releasing cargo suspended from at least one cargo hook release pendant in a suspension system coupled to a cargo hook release system includes receiving a voltage release signal at a cargo hook control interface and a cargo release harness assembly; receiving an energizing voltage signal at the cargo release harness assembly; energizing a relay in response to receiving the energizing voltage signal, the relay being electrically coupled to the cargo release harness assembly; automatically transmitting the voltage release signal from the cargo release harness assembly to at least one cargo hook release pendant in response to energizing the relay; and automatically releasing the cargo from at least one cargo hook release pendant in response to automatically transmitting the voltage release signal. Also, the cargo hook release system includes the cargo hook control interface, the cargo release harness assembly, and at least one cargo hook release pendant.

According to another aspect of the invention, a cargo hook release system for releasing cargo suspended from at least one cargo hook release pendant in a suspension system includes a cargo hook control interface comprising a manual-normal hook release switch and a manual-emergency hook release switch; a cargo release harness assembly including a relay electrically coupled to a cargo harness interface; a FCC being operable to transmit an energizing voltage signal to the cargo release harness assembly; and at least one cargo hook release pendant operably coupled to the cargo harness interface. Each of the cargo hook control interface and cargo release harness assembly is operable to receive a voltage release signal indicative of activation of the cargo hook release system. Also, the relay is operable to selectively transmit the energizing voltage signal from the flight control computer to the at least one cargo hook release pendant.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

An embodiment of an automatic cargo release system includes an automatic cargo release harness assembly that is coupled to a suspension system of a VTOL aircraft such as, for example, a helicopter with other embodiments discussed herein. The automatic cargo release harness assembly implements a release of a cargo/load that is attached to an attachment point. In an embodiment, the cargo/load is released when the automatic cargo release harness assembly receives information upon depressing a manual cargo release switch or when an automatic cargo release has been commanded by the FCC after the cargo hook release system is armed. The automatic cargo release harness assembly includes a harness to the FCC, a relay, and a cargo hook release interface. The cargo hook release interface includes a harness and connectors that couples to existing aircraft components located in a cabin of the helicopter. In embodiments, the relay receives a discrete voltage output from the FCC for energizing the relay and allowing voltage to flow directly to the cargo hook (thereby bypassing the manual switch) and causing the actuation and opening of a cargo hook pendant connected to an attached cargo/load. When the relay is not energized, the cargo hook pendant only accepts the voltage from the manual cargo hook controller when the manual release switch is closed; which in turn causes the actuation and opening of the cargo hook.

Figure 1:
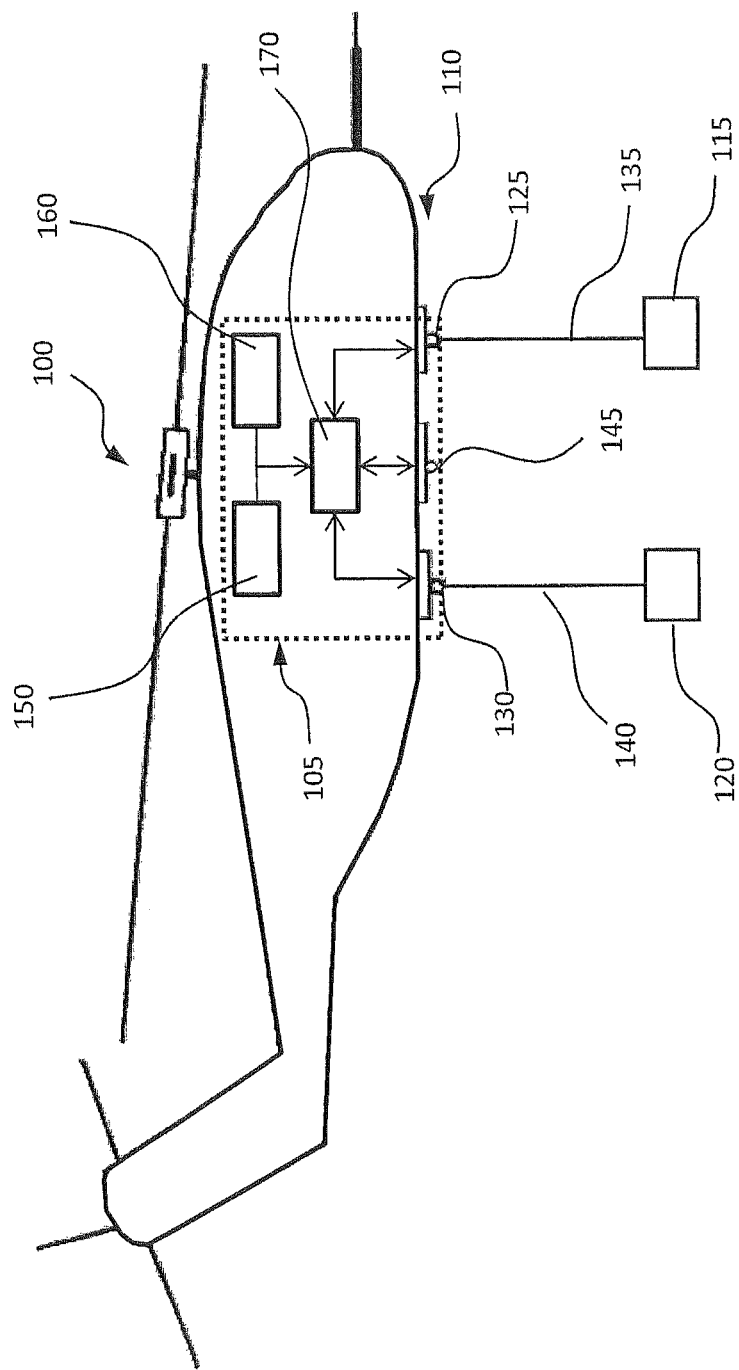
FIG. 1 illustrates a side view of an exemplary embodiment of a VTOL aircraft having a cargo hook release system according to an embodiment of the invention.

Referring now to the drawings, FIG. 1 illustrates an exemplary VTOL aircraft such as, for example, helicopter 100 having a cargo hook release system 105 that is coupled to a three-point suspension system 110 according to an embodiment of the invention. In some non-limiting examples, the helicopter 100 may be a manned, unmanned, or an optionally piloted VTOL aircraft. In one non-limiting example, the helicopter 100 may utilize two cargo hook pendants to connect to two separate external cargo/loads 115, 120 that are attached to the suspension system 110. The cargo hook release system 105, in an embodiment, includes an automatic cargo release harness assembly 170 (FIG. 2) operably connected to a flight control computer 160 ("FCC 160") and a manual cargo hook control interface 150. The manual cargo hook control interface 150 includes a cabin hook controller, harness and connectors (not shown) that couples to existing aircraft components located in a cabin of the helicopter 100. In an embodiment, the automatic cargo release harness assembly 170 includes a relay 210 (FIG. 2) that may selectively receive signals, under normal flight conditions, from a manual-normal hook release switch 240 (FIG. 2) of the manual cargo hook control interface 150 in order to implement a manual cargo release as is shown and described with reference to FIG. 2. In a non-limiting example, the relay 210 may be a conventional electromechanical relay that makes or breaks a connection with lines 250, 278 upon receiving an electric current on line 230. In another non-limiting embodiment, the relay 210 may be hybrid contactors that makes or breaks the connection with lines 250, 278. In another embodiment, the manual cargo hook control interface 150 includes a manual-emergency hook release switch 280 (FIG. 2) for receiving emergency signals from a cabin hook controller, under emergency flight conditions, for manual and emergency release of either one or both loads 115, 120 connected to respective cargo hook assemblies 125, 130 through cargo hook pendants attached to cable/sling 135, 140.

Figure 2:
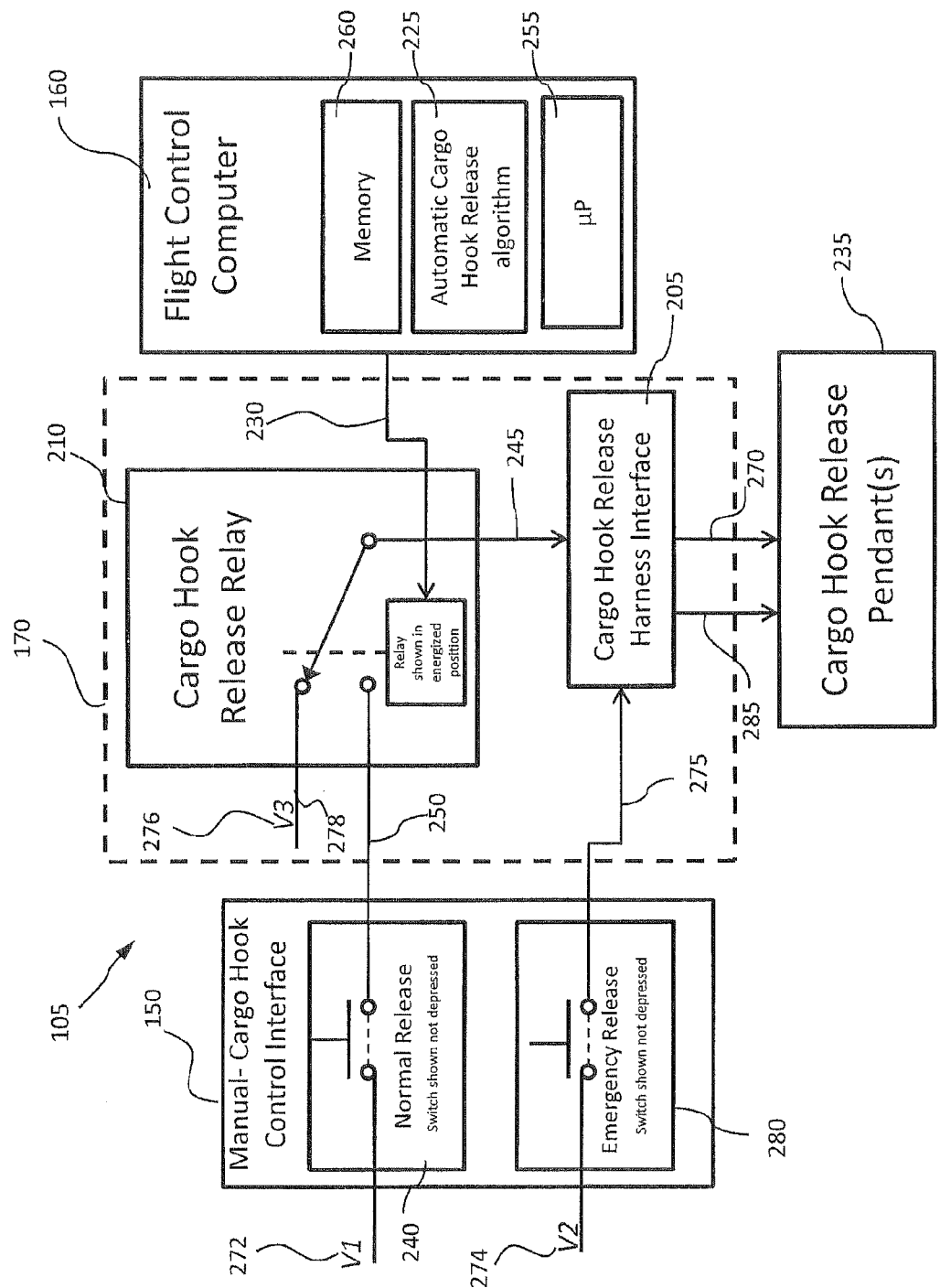
FIG. 2 illustrates a schematic block diagram of the system of FIG. 1 according to an embodiment of the invention.

In other embodiments, the FCC 160 may provide an automatic release signal (i.e., a discrete voltage output signal) to the cargo release harness assembly 170 (described in detail in FIG. 2) in order to energize a relay 210 (FIG. 2) and trigger actuation and opening of one or both of the cargo hook assemblies 125, 130 for a precise delivery of the cargo/load or, alternatively, effectuate a release of the cargo/load attached to one or both of the cargo hook assemblies 125, 130 in an event of an engine failure that requires jettisoning of the cargo/load (described in detail in FIG. 2). Although a single-point suspension to loads 115, 120 is shown for suspension system 110 but, in other embodiments, either a two-point suspension utilizing hook assemblies 125, 130 or an additional cable/sling may also be utilized for attaching the center hook 145 to a load and providing an additional suspension/attachment point to the helicopter 100 without departing from the scope of the invention. It is to be appreciated that, for the purposes of describing the invention, the term "attachment point" or "suspension point" is intended to refer to hook assemblies 125, 130, 145 and a sling 135, 140 that provide an attachment between the loads 115, 120 and the helicopter 100.

FIG. 2 illustrates a schematic block diagram of the cargo hook release system 105 including a cargo release harness assembly 170 according to an embodiment of the invention. Particularly, the cargo hook release system 105 includes the cargo hook control interface 150, a cargo release harness assembly 170, a FCC 160 and substantially similar cargo hook release pendants 235 connected to each cargo hook assembly 125, 130, 145 (shown in FIG. 1). In an embodiment, the cargo release harness assembly 170 includes a relay 210 and a cargo harness interface 205. In an embodiment, the cargo harness interface 205 is a harness with mating connectors to interconnect the cargo hook control interface 150, the cargo hook control interface 150 and the FCC 160. Under normal operation of the cargo hook release system 105, the relay 210 remains de-energized (so that a normal release switch operation is available via the manual-normal hook release switch 240 that is coupled to the cargo hook control interface 150). In one embodiment, the cargo release harness assembly 170 may implement an automatic cargo hook release algorithm 225 that is implemented and initiated by the FCC 160 based on pre-determined instructions stored in memory 260 in order to energize relay 210 and automatically release one or more cargo/loads connected to the cargo hook assemblies 125, 130, 145 (FIG. 1). In other embodiments, the cargo release harness assembly 170 may implement a manual cargo hook release and route cargo release signals that are received from the cargo hook control interface 150 through to the release mechanisms of the cargo hook pendants 235 attached to a suspension system 110 (shown in FIG. 1) in order to implement at least one of a manual normal release (via manual-normal hook release switch 240) and a manual emergency release (via manual-emergency hook release switch 280) of loads 115, 120 attached to the cargo hook pendants 235 of cargo hook assemblies 125, 130 as described below. The cargo hook control interface 150 includes a manual-normal hook release switch 240 and a manual-emergency hook release switch 280. The switches 240, 280 are in an un-activated state (i.e., not depressed) until selected. The manual-normal hook release switch 240 may be selected (i.e., depressed) in order to selectively transmit a manual cargo hook release signal on line 250 for implementing a manual cargo release, under normal flight conditions, and delivery of one or all loads 115, 120 connected to one or more of the cargo hook pendants 235. Also, the manual-emergency hook release switch 280 may be selectively depressed in order to selectively transmit an emergency release signal on line 275 for an emergency release of either one or both loads 115, 120 connected to one or more of the cargo hook pendants 235.

Also shown in FIG. 2, the FCC 160 includes a microprocessor 255 and memory 260 in order to implement the automatic cargo hook release algorithm 225 and precisely release a load attached to cargo hook pendants 235, which includes transmitting energizing signals to the cargo release harness assembly 170 for implementing the algorithm 225. In embodiments, the microprocessor 255 can be any type of processor (CPU) including a general purpose processor, a digital signal processor, a microcontroller, an application specific integrated circuit, a field programmable gate array or the like. Also, in embodiments, memory 260 may include random access memory (RAM), read only memory (ROM) or other electronic, optical or magnetic computer readable mediums. In an embodiment, the FCC 160 initiates an automatic arming/disarming of the cargo hook release system 105 after a predetermined number of seconds of sensing a load on any of the hook assemblies and other appropriate criteria are met. These criteria include, for example, load persistence, aircraft control mode is in a flight mode, etc. The FCC 160 may initiate an automatic disarming if the load falls below the threshold needed to enable the system 105 or if the aircraft has one or more active weight on wheels ("WOW") indications. The FCC 160 may cause arming hook voltage release signals such as, manual voltage release signal 272, emergency voltage release signal 274 and automatic voltage release signal 276 to be received at the respective manual-normal hook release switch 240, the manual-emergency hook release switch 280 and relay 210 upon arming (i.e., being enabled or activated) the cargo hook release system 105.

The cargo hook release system 105 may provide a manual and normal release function via the manual-normal hook release switch 240 when the relay 210 is de-energized. Upon closure (or depressing) of the manual-normal hook release switch 240, a voltage release signal 272 is allowed to pass from the manual-normal hook release switch 240 to the de-energized relay 210 on line 250 as a manual release signal and straight through the cargo harness interface 205 and to one or more of the cargo hook pendants 235 via line 270, which activates at least one of the hook assemblies 125, 130, 145 to open.

In another embodiment, the cargo hook release system 105 may provide a manual and emergency release function via the manual-emergency hook release switch 280. The manual-emergency hook release switch 280 transmits a hook voltage release signals 274 on voltage line 275 such as, for example, 28 V, to the cargo harness interface 205 via line 285 to the cargo hook release pendant(s) 235 in response to selection ((or depressing) of the manual-emergency hook release switch 280. The manual-emergency hook release switch 280 has a direct route to the cargo hook and does not pass through/utilize the relay 210 so that it is available at all times. Upon closure of the manual-emergency hook release switch 280, the manual-emergency hook release switch 280 selectively transmits an emergency release signal (as voltage release signal 274) such as, for example, 28 V, on line 275 for an emergency release of either one or both loads 115, 120 connected to respective cargo hook assemblies 125, 130 through cable/sling 135, 140. It is to be appreciated that the manual-emergency hook release switch 280 provides the voltage release signal 274 directly to one or more of the cargo hook pendants 235 via the interconnect cargo harness interface 205 and lines 275, 285. The manual-emergency hook release switch 280 transmits the voltage release signal 274 to one or more cargo hooks for emergency releasing either one or both loads 115, 120 (FIG. 1) connected to respective cargo hook assemblies 125, 130 through cable/sling 135, 140 without interception by the cargo harness interface 205. It is to be appreciated that the manual-emergency hook release switch 280 output is connected directly to cargo hook release pendant(s) 235 via the cargo harness interface 205 through lines 275 and 285. The manual-emergency hook release switch 280 transmits the voltage release signal 274 to one or more cargo hooks for an emergency release of either one or both loads 115, 120 (FIG. 1) connected to respective cargo hook assemblies 125, 130 through cable/sling 135, 140 without interception by the cargo harness interface 205.

Also, cargo hook release system 105 may provide an automatic release of cargo attached to a cargo hook release pendant(s) via the automatic cargo hook release algorithm 225. In order to implement the algorithm 225, the FCC 160 may transmit a suitable energizing voltage such as, for example, a 28 V signal as an automatic release signal on line 230. The relay 210 is energized by the automatic release signal (i.e., the 28V energizing voltage signal). When energized, the relay 210 switches to a secondary contact that is energized with the voltage release signal 276. The secondary contact bypasses the manual-normal release switch 240 (i.e., the manual-normal hook release switch 240 is open and disconnected from the relay) and connects the voltage release signal 276 directly to line 245. This connection circumvents (or bypasses) the manual-normal hook release switch 240 allowing the automatic voltage release signal 276 to travel via line 245 to the cargo harness interface 205 for a precise release of cargo/load connected to one or more of the cargo hook pendants 235 attached to one or more of the hook assemblies 125, 130, 145 (FIG. 1). In an embodiment, the energizing voltage on line 230 received by relay 210 may be any voltage or other implementation suitable to energize coils in relay 210 that causes relay 210 to change state. The relay 210 may be a conventional electromechanical relay that makes or breaks a connection upon passing an electric current to the relay 210. In an embodiment, the relay 210 is de-energized by the FCC 160 after precisely releasing the cargo/load.

The technical effects and benefits of exemplary embodiments include an automatic cargo release harness assembly that is coupled to a suspension system of a helicopter. The automatic cargo release harness assembly implements a release of a cargo/load that is attached to an attachment point. In an embodiment, the cargo/load is released when the automatic cargo release harness assembly receives information upon depressing a manual cargo release switch or when an automatic cargo release has been commanded by the FCC after the cargo hook release system is armed. In embodiments, the relay receives a discrete voltage output from the flight control computer for energizing the relay and allowing a voltage to flow directly to the cargo hook (thereby bypassing the manual switch). When the relay is not energized, it only accepts the voltage from the manual cargo hook controller when the manual release switch is closed; which in turn causes the actuation and opening of the cargo hook.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cargo hook release system for releasing cargo suspended from at least one cargo hook release pendant in a suspension system, comprising:
    a cargo hook control interface comprising a manual-normal hook release switch and a manual-emergency hook release switch;
    a cargo release harness assembly including a relay electrically coupled to a cargo harness interface;
    a flight control computer including a processor that is configured to transmit an energizing voltage signal to the cargo release harness assembly; and
    at least one cargo hook release pendant operably coupled to the cargo harness interface;
    wherein the relay is in a de-energized condition during normal operation of the cargo hook release system, and wherein the relay is energized during automatic release of the cargo;
    wherein each of the cargo hook control interface and cargo release harness assembly is operable to receive a voltage release signal indicative of activation of the cargo hook release system; and
    wherein the relay is operable to selectively transmit the energizing voltage signal from the flight control computer to the at least one cargo hook release pendant.

2. The system of claim 1, wherein the energizing voltage signal is indicative of an automatic release of the cargo from the suspension system.

3. The system of claim 1, wherein the at least one cargo hook release pendant is operable to automatically release the cargo in response to receiving the energizing voltage signal.

4. The system of claim 1, wherein the voltage release signal comprises a manual voltage release signal, an emergency voltage release signal and an automatic voltage release signal.

5. The system of claim 4, wherein the manual-normal hook release switch is operable to receive the manual voltage release signal, the manual-emergency hook release switch is operable to receive the emergency voltage release signal, and the relay is operable to receive the automatic voltage release signal.

6. The system of claim 5, wherein the manual-normal hook release switch is operable to transmit the manual voltage release signal to the cargo release harness assembly in response to activating the manual-normal hook release switch.

7. The system of claim 5, wherein the cargo harness interface being operably coupled to each of the relay and the at least one cargo hook release pendant, the cargo harness interface being operable to receive the manual voltage release signal in response to de-energizing the relay.

8. The system of claim 5, wherein the cargo harness interface is operable to receive the automatic voltage release signal in response to the energizing of the relay, the cargo harness interface being coupled to each of the relay and the at least one cargo hook release pendant.

9. The system of claim 8, wherein the cargo harness interface is operable to transmit the automatic voltage release signal to the at least one cargo hook release pendant.

10. The system of claim 1, wherein each of the manual-normal and manual-emergency hook release switches are operably coupled to the cargo release harness assembly.

11. The system of claim 1, wherein the manual-normal hook release switch is configured to transmit a second energizing voltage signal to the deenergized relay and straight through the cargo hook control interface upon closure of the manual-normal hook release switch.

12. The system of claim 1, wherein the manual-emergency hook release switch is configured to transmit a third energizing voltage signal directly to the cargo hook control interface upon closure of the manual-emergency hook release switch.

13. The system of claim 1, wherein the cargo hook control interface includes a harness with mating connectors that interconnects the cargo hook control interface to each of the cargo hook control interface and the flight control computer to the at least one cargo hook release pendant.

* * * * *